(12) United States Patent
Gissel et al.

(10) Patent No.: US 7,051,324 B2
(45) Date of Patent: May 23, 2006

(54) EXTERNALIZED CLASSLOADER INFORMATION FOR APPLICATION SERVERS

(75) Inventors: Thomas R. Gissel, Round Rock, TX (US); Michael Levi Fraenkel, Cary, NC (US); Brian Keith Martin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 10/346,291

(22) Filed: Jan. 16, 2003

(65) Prior Publication Data

US 2004/0143826 A1     Jul. 22, 2004

(51) Int. Cl.
    G06F 9/44    (2006.01)
(52) U.S. Cl. .......................................... 717/166; 718/1
(58) Field of Classification Search ........ 717/166–148; 718/1, 100, 102
    See application file for complete search history.

(56) References Cited

U.S. PATENT DOCUMENTS

| 6,272,674 | B1 | 8/2001 | Holiday, Jr. ................ 717/174 |
| 6,301,582 | B1 | 10/2001 | Johnson et al. ......... 707/103 R |
| 6,339,841 | B1 | 1/2002 | Merrick et al. ............ 717/166 |
| 6,446,254 | B1 | 9/2002 | Chapman et al. .......... 717/116 |
| 6,823,509 | B1 * | 11/2004 | Webb ............................ 718/1 |

OTHER PUBLICATIONS

BeanShell Simple Java Scripting, Version 1.3 no date, http://www.beanshell.org/manual/bshmanual.html.*

Transparent Sharing of JAVA Applets: A Replicated Approach, James Begole et al, ACM, 1997, pp. 55-64.*
Dynamic Classloading in the JAVA Virtual Machine, Sheng Liang et al, ACM, 1998, pp. 36-44.*
Implementation Jalapeno in JAVA, Bowen Alpern et al, ACM, 1999, pp. 314-324.*
"JMX—Network Management Software", by Billy Newport, downloaded from www2.therserverside.com on Nov. 12, 2002, 7 pages.
"Chapt. 24—Java Management Extensions", Advanced Java 2 Platform—How to Program, by H. M. Deitel, et al., published by Prentice Hall, ISBN 0-13-089560-1.

* cited by examiner

Primary Examiner—Todd Ingberg
(74) Attorney, Agent, or Firm—Robert H. Frantz; David A. Mims, Jr.

(57) ABSTRACT

A process and system for externalizing classloader information to non-application modules such as tool modules that do not reside within the same Application server virtual machine such as a J2EE AppServer JVM. Tools that read and display classloader information typically need to co-reside within the AppServer because of the virtual machine security mechanisms that prevent classes outside the virtual machine itself to introspect the classloaders. This presents a problem for tooling vendors because most server owners do not want anything other than their applications running within the AppServer virtual machine. The invention allows tooling vendors to create a classloader tool that is external to the AppServer virtual machine, and which is running in a completely separate virtual machine, thus having minimal overhead on production systems, but which allows classloading through standard or open (e.g. non-proprietary) interfaces.

21 Claims, 5 Drawing Sheets

EXTERNALIZED CLASSLOADER INFORMATION FOR APPLICATION SERVERS

BACKGROUND OF THE INVENTION

1. Field of the Invention

This invention relates to technologies to allow program objects being executed by processes outside a virtual machine process to be accessed via standard or "normal" class loading operations by program objects being executed inside the virtual machine process.

2. Background of the Invention

Object-oriented programming ("OOP") methodologies are well known and widely adopted, as they promote efficient team development of software products, allow minimized maintenance activities, and provide abilities to easily and dependably integrate modules and objects from older designs, other designers, and new designs together.

In contrast to procedural programming methodologies, OOP allows programmers to define data types of data structures and types of operations or functions which can be performed on those data structures, which defines the data structure as an "object". Relationships between objects may be defined, as well, such that some objects may share or "inherit" characteristics from other objects, allowing variations of existing objects to be quickly and efficiently developed. Categories of objects are referred to as a "class" of objects. Objects of a given class share common properties as defined by the class.

A number of companies have developed and marketed software development tools which support OOP programming languages ("OOPL"), including but not limited to Xerox Corporation's Smalltalk, Bell Laboratory's C++, Microsoft Corporation's Visual C++, Sun Microsystems' Java, and Open Management Group's ("OMG") Unified Modeling Language ("UML") are programming languages which, among others, implement OOP concepts and methodologies.

In particular, Sun Microsystem's Java language has gained widespread use for its support of Internet technologies, such as "applets" and embedded Java scripts in web pages, "servlets" which can be run by a web server or application program server, etc. Java is especially useful for its portability or non-machine-specific design, which enables Java code to be run or executed by any computing platform which is equipped with a Java interpreter. The "open" nature of Sun's Java specifications has also allowed many vendors to participate in the marketplace, whether by developing and providing application programs, administrative tools, or programming tools.

Java code is pseudo-compiled into "bytecode", which is later executed by a machine-specific Java interpreter. The interpreter converts the bytecodes to machine-specific instructions which are executed by the particular computer on which the Java program is being executed. Java defines the virtual computer for which the bytecode is designed as a "virtual machine", and thus, programming is done as if it is to be executed by the theoretical virtual machine. During actual execution on a computer, one or more Java Virtual Machines ("JVM") may be created by the computer's operating system, each JVM executing Java programs as if it were a real, independent computer. Java code can also be converted directly into machine-specific executable language using a special compiler, the results of which may also be executed within a JVM.

An enterprise server generally refers to a mainframe class computer which is suitable for running programs of a magnitude commensurate with an "enterprise", such as making bulk airline reservations online, tracking large real time trading and commodities, etc. Java 2 Platform Enterprise Edition ("J2EE"), which was developed by Sun Microsystems with other notable partners such as International Business Machines ("IBM"), provides a Java-compliant platform for enterprise class computers, and is in many ways a subset of functionality of the Java 2 Platform Standard Edition ("J2SE").

J2EE provides several key features which make it useful in enterprise computing environments, including support for a "thin client" tiered arrangement between client computers and servers, as well as supporting platform-independence of modules and code (e.g. portability) so that vendors may easily target a wide array of enterprise computers with a single design of software.

Additionally, J2EE supports Common Object Request Broker Architecture ("CORBA"), and a more Java-specific and further evolved Enterprise Java Beans ("EJB") concept. CORBA and EJB concepts allow objects to "discover" the existence and availability of other classes and objects which they may need for data or processing functions, and to utilize instances of those objects on an as-needed basis, whether running on the same computing platform or working together over a computer network. In particular, EJB is a server-based technology for the delivery of program components in an enterprise environment. EJB supports the Extensible Markup Language (XML) to define Java Beans (e.g. program modules which are designed conformant to the Java Component Architecture), and provides enhanced deployment and security features which have gained it rapid adoption by many enterprise server owners and operators.

Java Message eXtensions ("JMX") is the Java specification which, if implemented by an vendor of a software product, allows software developers to easily integrate their new designs with existing network management solutions. To take advantage of JMX, objects are written compliant to the standard as "MBeans" (e.g. "manageable Java Beans"). A JMX client can invoke methods and access attributes of MBeans via a JMX container in which they reside. Additionally, clients can "register" with an MBean to receive notifications as needed.

The term "application server" is used widely to refer to a program running on a computer which provides a function needed by a client computer, such as a web server as related to a web browser, or a banking database server as related to a Automated Teller Machine ("ATM"). Application servers can be small, insubstantial programs executed by computing platforms with minimal resources, they may be substantial programs (e.g. groups of many objects) running on enterprise class computers, or any combination there between.

Application servers, clients, computer networks, OOP, OOP languages, Java, J2EE, JMX and MBeans are all well known in the art, and information regarding these concepts and specifications is openly available from the vendors mentioned.

Turning to FIG. 1, one possible arrangement (10) in an application server ("AppServer") is shown in which multiple client or customer application modules (22a, 22b, ... 22n) are executed within the same AppServer process such as J2EE-compliant AppServer JVM process as a tool user interface ("UI") module (24). The application modules (22a, 22b, ... 22n) are represented in this example by Enterprise Archives ("EAR"), which are containers of multiple Java objects. The Tool UI (24) may directly access administrative information about the other modules within the same AppServer JVM process (21) using standard JMX application programming interface ("API") calls, and thus the tool module may provide administrative functions such as console operations, statistical reports, etc. Because Java allows for easy integration and cooperation of modules by different vendors, the vendors of the tool module(s) and application modules may be many.

However, by running the Tool UI (24) module(s) in the same JVM (21) as the customer's application modules (22a, 22b, . . . 22n), several undesirable issues arise. First, the JVM processing bandwidth is divided between all the modules running in it, so a tool module or process may negatively impact the performance of an application process. Additionally, the running of tool modules in the same AppServer as application processes may represent a security issue. As such, many owners of enterprise servers have adopted policies that only application modules may be run in their AppServer JVM's, and all other administrative and support modules must be run in other JVM's.

In addition, many enterprise server owners have experienced difficulties getting effective diagnosis and support of problems which arise when application modules from a wide variety of vendors are run inside the same JVM. So, many of them have adopted even stricter policies that only application modules from the same vendor or supplier may be run in an AppServer JVM.

So, tool vendors for such application servers are forced to design their modules for execution outside the AppServer JVM where application modules are running. However, J2EE AppServers do not allow modules which are running outside of an AppServer JVM to introspect into modules running inside the AppServer JVM, which prevents tool modules running outside the AppServer JVM from obtaining administrative information regarding modules running within the AppServer JVM.

One attempt to solve this problem is shown in FIG. 2. In this approach, the tool vendor may place a minimized module or servlet (23) into the AppServer JVM (23). The Classloader Tooling EAR (23) exports information to a set of tools (24) running outside the AppServer JVM (21). This approach, though, means that application modules must perform proprietary or non-J2EE-standard operations to load interface or class information about the tools from the tool module. This means that in order for the tools to be effective, the application modules must be designed to take advantage of non-standard interfaces, which makes the application modules less portable and less reusable in environments that have other configurations. Also, while minimizing the performance impact of placing an non-application module in the AppServer process, it still may produce a security problem and technically still violates the policies of many enterprise server owners and operators.

Therefore, there is a need in the art for a system and method which provides external access by tools for information regarding the performance and administration of application modules running within an application server process such as a J2EE AppServer JVM, without the need for the tools to run within the same JVM as the application modules, and without the need for the application modules to implement custom or proprietary application programming interfaces.

BRIEF DESCRIPTION OF THE DRAWINGS

The following detailed description when taken in conjunction with the figures presented herein provide a complete disclosure of the invention.

SUMMARY OF THE INVENTION

This invention externalizes classloader information for a virtual machine such as a Java Virtual Machine ("JVM") by providing an interface to classloader runtime methods via a Java Management Extension ("JMX") Management Bean ("MBean"). For flexibility, most Java 2 Platform Enterprise Edition ("J2EE") Application Servers ("AppServers") have different granularities of classloader isolation levels. Therefore, to insure that the most granular isolation level is supported by this invention, the classloader information is externalized from a J2EE Module perspective, via a Module MBean. This allows external non-application objects such as Tooling and Administrative objects to be run in a separate JVM from the AppServer JVM, while avoiding the necessity for application objects running the AppServer JVM to implement a custom or proprietary interface. Instead, using this invention, the application objects may load the external classes as if they were running in the same AppServer JVM.

DESCRIPTION OF THE INVENTION

The present invention is preferably realized in conjunction with a "standard" enterprise-class web server suite such as IBM's WebSphere Version 4.0 or greater, executing on an server such as an IBM iSeries computer. According to the preferred embodiment, J2EE MBeans are used as an integral part of the solution to the problem of externalizing classloader information to a JVM. However, it will be recognized by those skilled in the art that other combinations of web server software and OOP programming technologies which achieve the same functionality may be employed without departing from the spirit and scope of the present invention.

Figure 4:
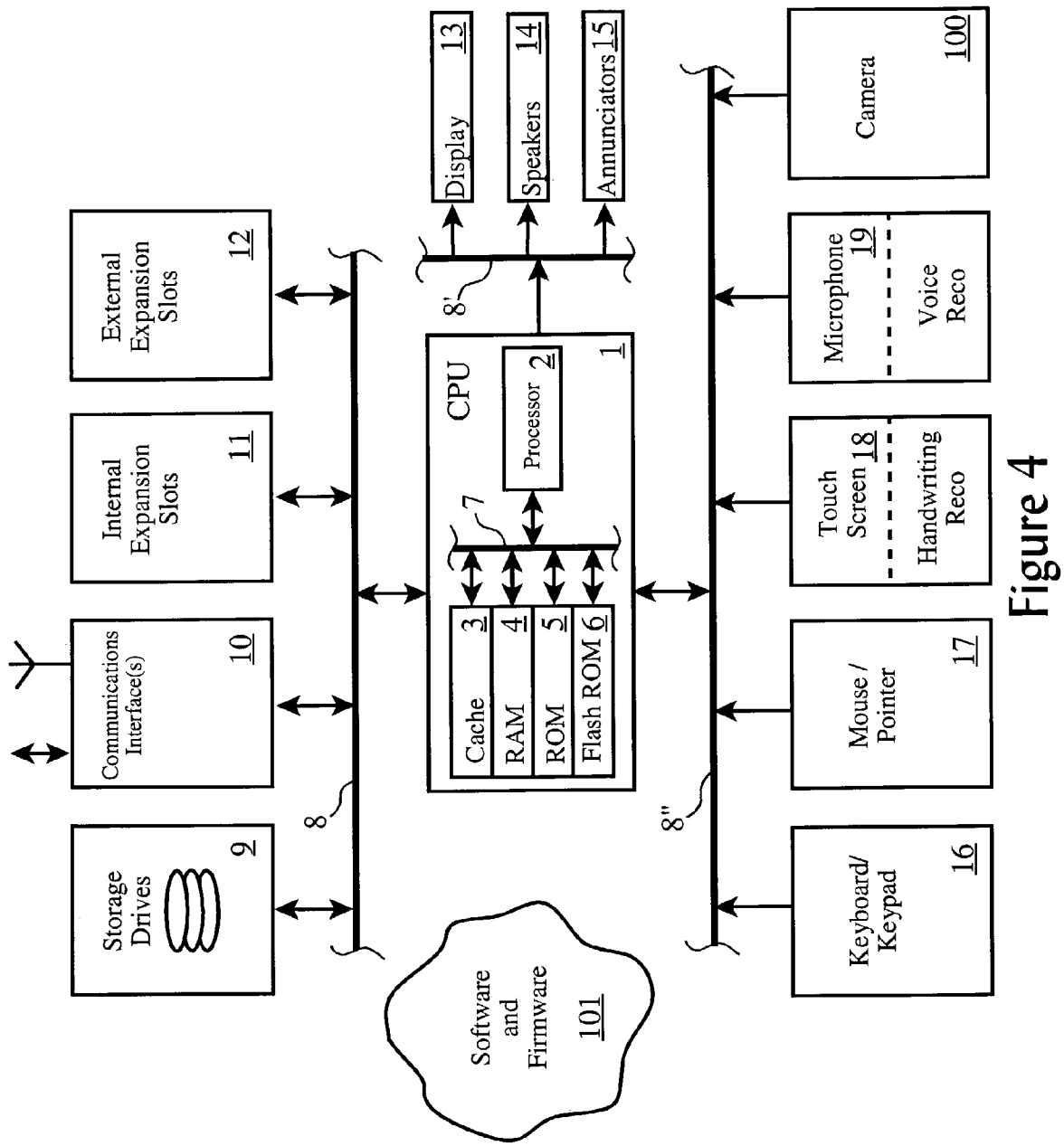
FIG. 4 depicts a generalized computing platform architecture, such as a personal computer, server computer, personal digital assistant, web-enabled wireless telephone, or other processor-based device.

Turning to FIG. 4, a generalized configuration of a web server computing platform is illustrated, including a central processing unit (1) ("CPU"), which is typically comprised of a microprocessor (2) associated with random access memory ("RAM") (4) and read-only memory ("ROM") (5). Often, the CPU (1) is also provided with cache memory (3) and programmable FlashROM (6). The interface (7) between the microprocessor (2) and the various types of CPU memory is often referred to as a "local bus", but also may be a more generic or industry standard bus.

Many computing platforms are also provided with one or more storage drives (9), such as hard-disk drives ("HDD"), floppy disk drives, compact disc drives (CD, CD-R, CD-RW, DVD, DVD-R, etc.), and proprietary disk and tape drives (e.g., Iomega Zip [TM] and Jaz [TM], Addonics SuperDisk [TM], etc.). Additionally, some storage drives may be accessible over a computer network.

Many computing platforms are provided with one or more communication interfaces (10), according to the function intended of the computing platform. For example, a computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Some specialized computing platforms such as wireless networked computers may also be provided with a radio frequency ("RF") interface with antenna, as well. In some cases, the computing platform may be provided with an infrared data arrangement ("IrDA") interface, too.

Computing platforms are often equipped with one or more internal expansion slots (11), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as portable computers, are provided with one or more external expansion slots (12) allowing the user the ability to easily install and remove hardware expansion devices, such as PCMCIA cards, Smart-Media cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, however, the bus (8) may be of a proprietary design.

A computing platform is usually provided with one or more user input devices, such as a keyboard or a keypad (16), and mouse or pointer device (17), and/or a touch-screen display (18). Additionally, a microphone (19) is supplied with the computing platform, which may be used for a variety of "audio enabled" applications, such as recording audio and voice signals, making Internet telephone calls, voice navigation of web sites, dictating text and commands using voice recognition capabilities, etc. Some computing platforms are also equipped with a camera device (100), such as a still digital camera or full motion video digital camera.

One or more user output devices, such as a display (13), are also provided with most computing platforms. The display (13) may take many forms, including a Cathode Ray Tube ("CRT"), a Thin Flat Transistor ("TFT") array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, and annunciators (15) may take the form of simple beep emitters or buzzers.

These user input and output devices may be directly interconnected (8', 8") to the CPU (1) via a proprietary bus structure and/or interfaces, or they may be interconnected through one or more industry open buses such as ISA, EISA, PCI, etc.

A computing platform is also typically provided with one or more software and firmware (101) programs to implement the desired functionality of the computing platforms.

Figure 5:
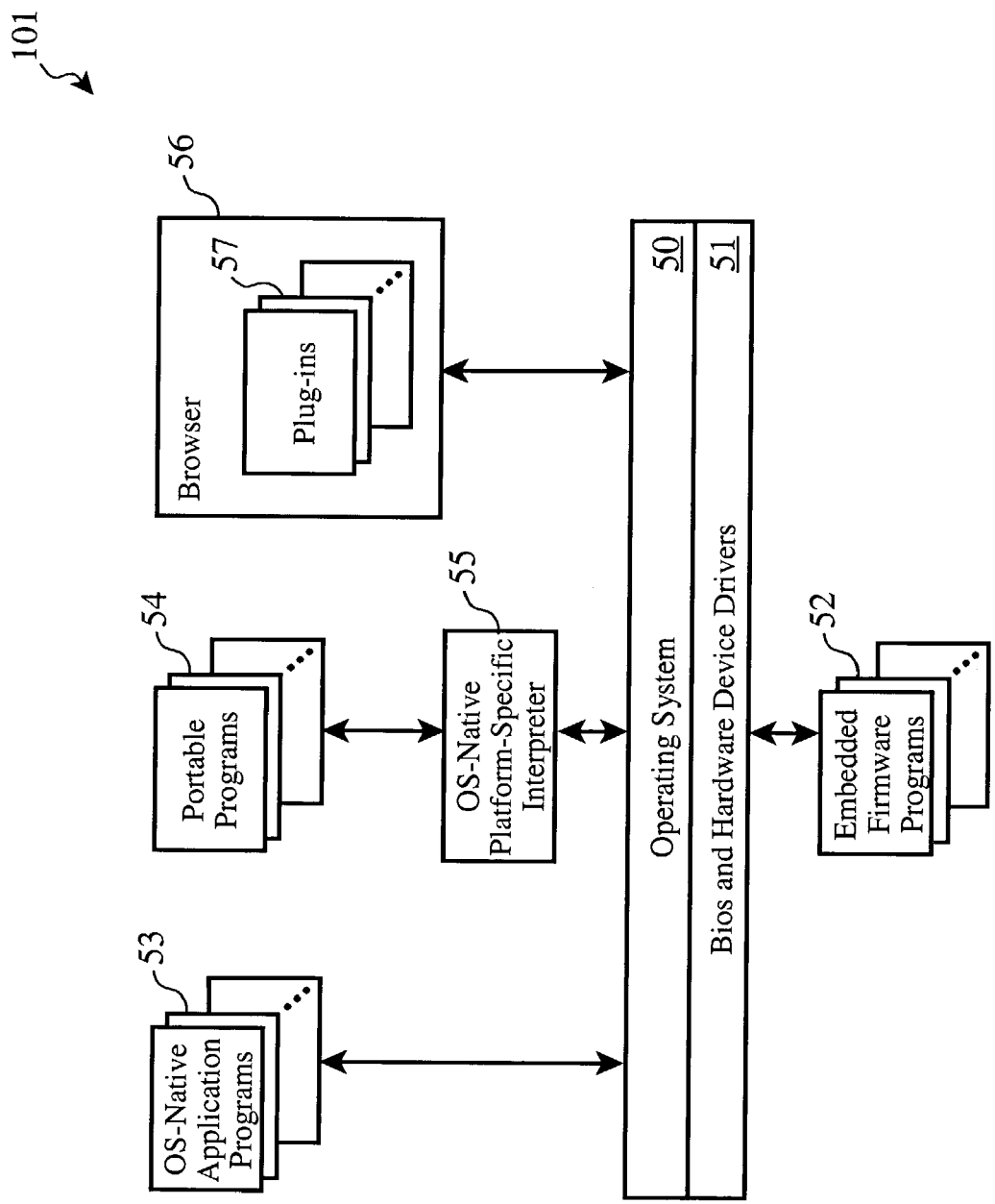
FIG. 5 shows a generalized organization of software and firmware associated with the generalized architecture of FIG. 1.

Turning to now FIG. 5, more detail is given of a generalized organization of software and firmware (101) on this range of computing platforms. One or more operating system ("OS") native application programs (53) may be provided on the computing platform, such as word processors, spreadsheets, contact management utilities, address book, calendar, email client, presentation, financial and bookkeeping programs.

Additionally, one or more "portable" or device-independent programs (54) may be provided, which must be interpreted by an OS-native platform-specific interpreter (55), such as a Java [TM] interpreter. Often, computing platforms are also provided with a form of web browser or microbrowser (56), which may also include one or more extensions to the browser such as browser plug-ins (57).

The computing device is often provided with an operating system (50), such as Microsoft Windows [TM], UNIX, IBM OS/2 [TM], LINUX, MAC OS [TM] or other platform specific operating systems. Smaller devices such as PDA's and wireless telephones may be equipped with other forms of operating systems such as real-time operating systems ("RTOS") or Palm Computing's PalmOS [TM]. It is conceivable that the trend of increasing memory and processing capabilities will continue throughout the near future to a point where such small devices reach a utility level to operate a server platforms, and as such, the present invention may become applicable to such platforms.

A set of basic input and output functions ("BIOS") and hardware device drivers (51) are often provided to allow the operating system (50) and programs to interface to and control the specific hardware functions provided with the computing platform.

Additionally, one or more embedded firmware programs (52) are commonly provided with many computing platforms, which are executed by onboard or "embedded" microprocessors as part of the peripheral device, such as a micro controller or a hard drive, a communication processor, network interface card, or sound or graphics card.

As such, FIGS. 4 and 5 describe in a general sense the various hardware components, software and firmware programs of a wide variety of computing platforms, including but not limited to personal computers, PDAs, PIMs, web-enabled telephones, and other appliances such as WebTV [TM] units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

According one embodiment, a J2EE JMX MBean is used to provide an external connection to another JVM process (e.g. a non-AppServer JVM), where the non-application object (e.g. tools and administrative objects) are running. JMX is employed in order to provide access to administrative information from and regarding the running application modules. This allows the application modules to load tool classes in a standard, well-understood manner, which makes the system more open to tool vendors and less dependent on proprietary methods and interfaces, while simultaneously maintaining the separation of JVMs for application modules and non-application modules (e.g. tool modules).

Using this system design, tools "appear" to the application modules to be running co-resident with the application modules in the same AppServer JVM, and the tool may introspect into the application modules. The standardized methods can be used by the application modules to use a well-known API (e.g. JMX in this implementation) to obtain administrative information from the AppServer JVM including the ClassLoader information, instead of interfacing in a proprietary manner to a special tooling servlet or module.

In our exemplary embodiment, there are two methods externalized via Module MBeans that provide the classloader information: getClassloaderDepth and getClassLoaderInfo.

The getClassloaderDepth method takes no input parameters, and returns the number of classloaders visible the module via an integer.

The getClassLoaderInfo method has four input parameters. The first input parameter is an integer level, which indicates the level of the classloader information to return, wherein 0 (zero) is the first classloader that will be checked when loading classes, and getClassLoaderDepth( )-1 is the last classloader that will be checked. The second input parameter is a Boolean value, atDepthOnly, which, when true, causes the getClassLoaderInfo method to only return the classloader information at the specified level. If atDepthOnly is false upon invocation of the getClassLoaderInfo method, all levels between 0 and level will be returned.

The third input parameter to the getClassLoaderInfo method is a Boolean value, showClasses, which if true, then loaded classes are returned. The fourth input parameter to the getClassLoaderInfo method is also a Boolean value, showCodeSource, which if true when showClasses is true, then the codeSource for each class will be returned.

The getClassLoaderinfo method returns a String which contains the classloader information in the form of extensible markup language ("XML") in our exemplary embodiment. Table 1 presents a portion of our Module MBeans XML Descriptor, as just described.

Figure 1:
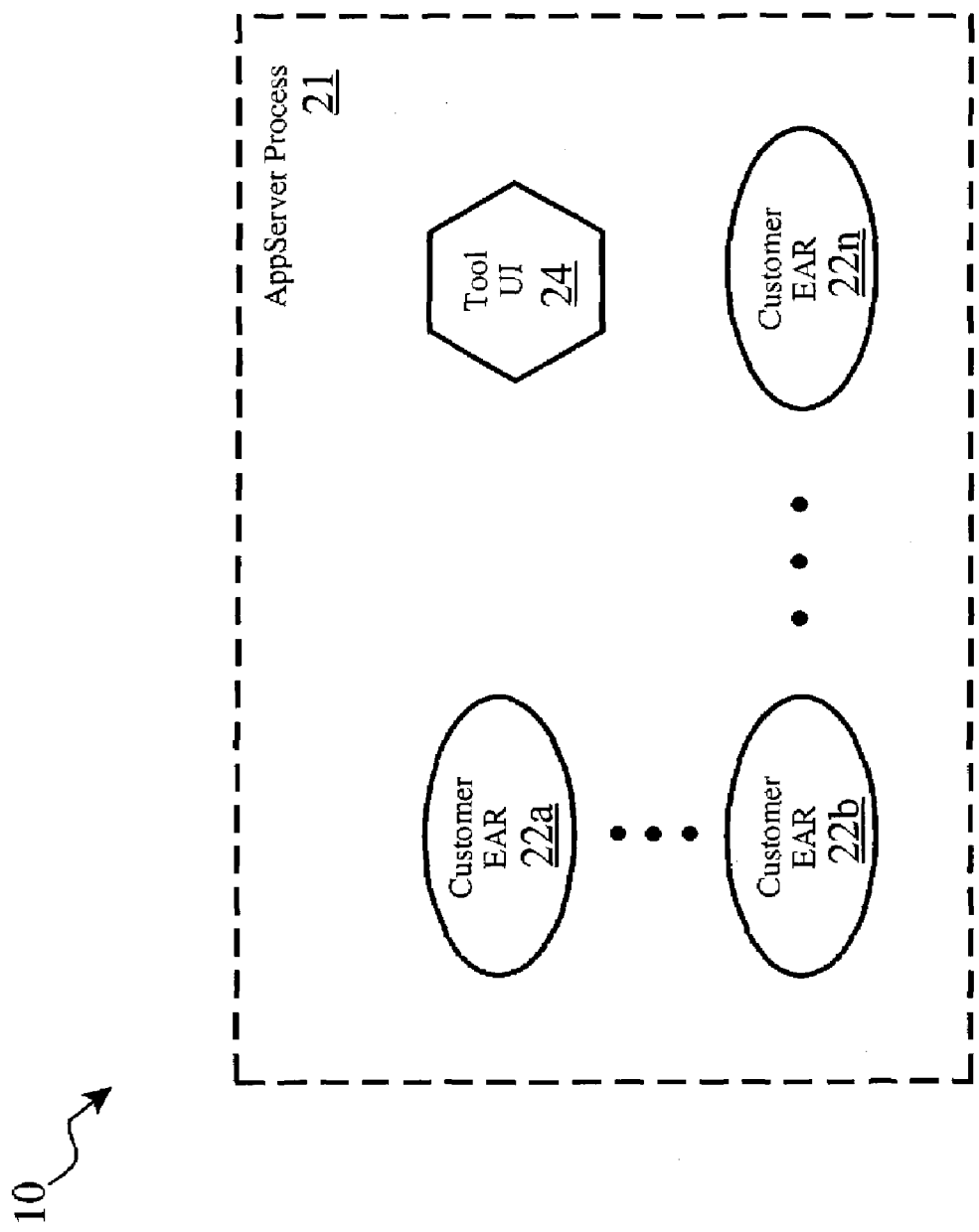
FIG. 1 illustrates one solution, albeit problematic, for running tool objects within an AppServer virtual machine process.
Figure 2:
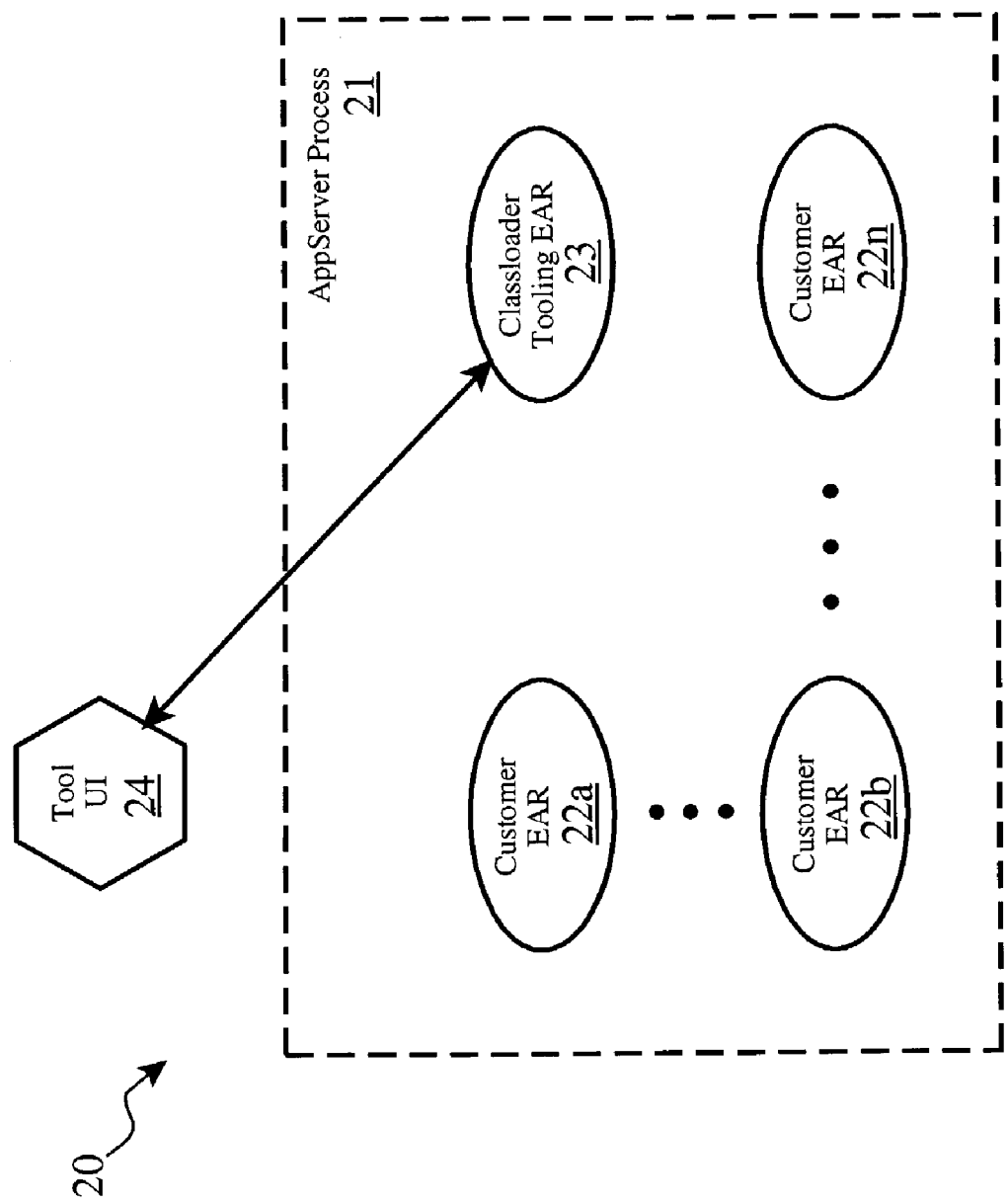
FIG. 2 illustrates one solution, also problematic, for running tool objects external to an AppServer virtual machine process using a minimized classloader object running within the AppServer virtual machine.
Figure 3:
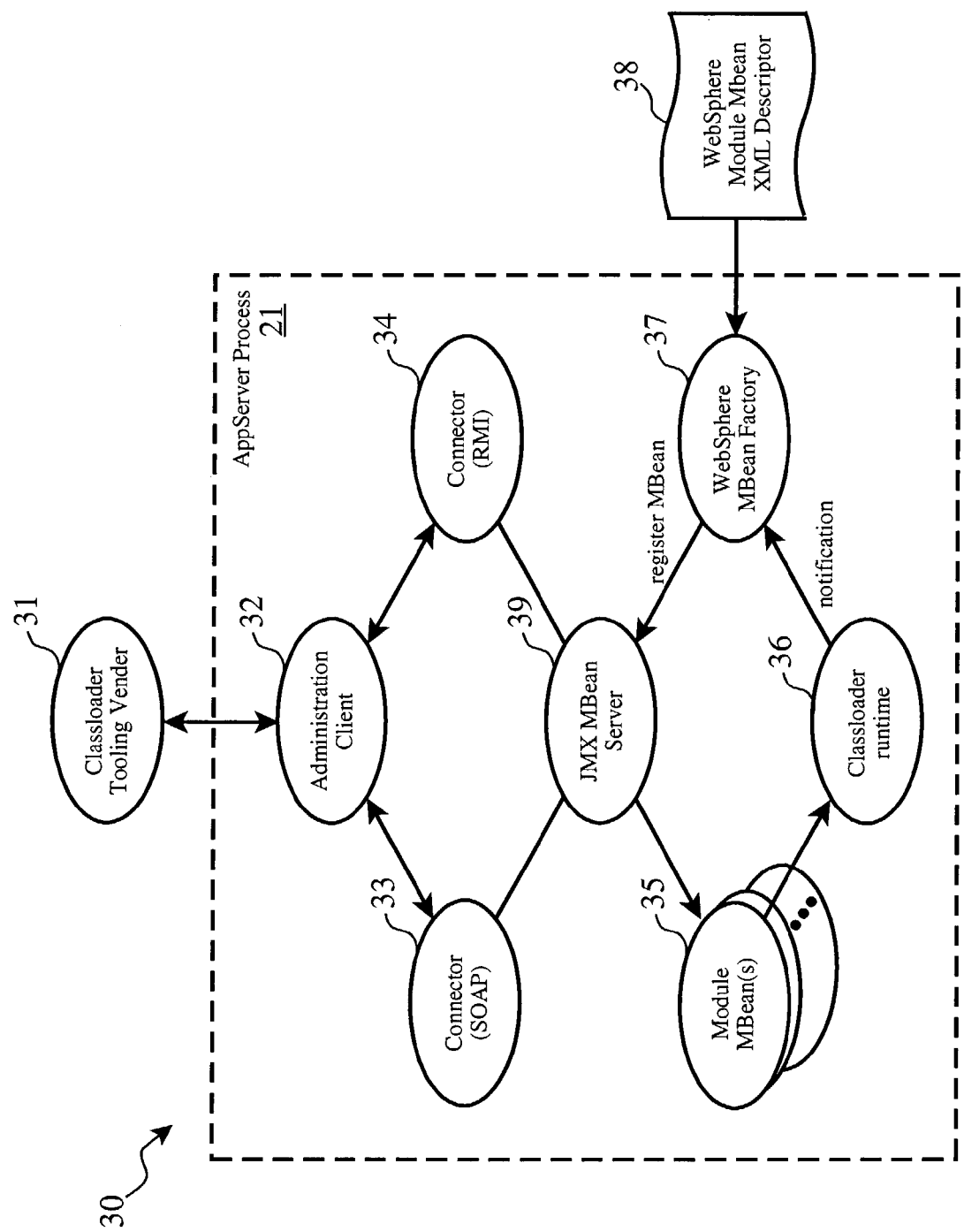
FIG. 3 illustrates the arrangement according to the present invention which provides standard classloading operations and avoids running non-application code within the AppServer virtual machine.

Turning to FIG. 3, an AppServer process and exemplary implementation (30) of the invention is shown. When the AppServer JVM (21) is equipped with JMX, an administration client (32) is also provided which provides interfaces to the external Classloader Tooling vendor's code (31). The JMX administration client (32) is provided with connectors, such as a Remote Machine Interface ("RMI") connector (34) or a Simple Object Access Protocol ("SOAP") connector (33).

The JMX MBean Server (39), which is a default component of the Java management extensions, manages the application module MBean(s) (35). The MBean Factory (37) receives notification of a need by an application module to load the externalized class (31) during AppServer runtime, which then uses the XML descriptor (38) to register the MBean with the MBean server (39).

As such, the externalized classes may be loaded as if they were actually running within the same AppServer process (e.g. within the same JVM) as the application modules). This provides the best of all possible previous solutions, and within a standard or open programming paradigm such as J2EE with JMX. The need to run the non-application class objects into the AppServer virtual machine is avoided, thus minimizing or eliminating the security and performance risks associated with running the non-application class objects into the AppServer virtual machine. Further, the application modules are allowed to load the externalized non-application modules' class information without need for implementation of a custom or proprietary interface.

It will be recognized by those skilled in the art that the scope of the present invention is not limited to the specific, detailed exemplary embodiment provided herein. Use of alternate programming languages, computing platforms, operating systems, enterprise server suites and models, and module descriptor languages is possible without departing from the spirit and scope of the invention. Therefore, the scope of the invention should be determined by the following claims.

TABLE 1

Example MBean XML Descriptor

```
<attribute description = "Number of classloaders in this module's classloading hierarchy"
    getMethod="getClasssLoaderDepth" name="classLoaderDepth" type ="int" />
<operation name="getClassLoaderInfo"
    description="Information about classloaders for this module"
    targetObectType="objectReference" impact="ACTION" role=operation"
    type="java.lang.String">
    <signature>
        <parameter name= "level" type = "int"
            description="the level of the classloader information to return. 0= the first
            classloader that will be checked when loading classes, getClassLoaderDepth ( ) -1
                the last classloader that will be checked."/>
        <parameter name = "atDepthOnly" type = "boolean" description = "if true, then only the
            classloader information at the specified level will be returned. If false, all levels
            between 0 and level will be returned." />
        <parameter name = "showClasses" type = "boolean" description = "if true, then loaded
            classes will be returned"/>
        <parameter name = "showCodeSource" type = "boolean" description = "if true, and
            showClasses is true, then the codeSource for each class will be returned" />
    </signature>
</operation>
```

What is claimed is:

1. A process for externalizing classloader information for object-oriented application programs through an interface at runtime, the process comprising the steps of:
   providing one or more application module manageable components within an application server virtual machine associated with one or more application modules;
   executing said application module(s) within an application server virtual machine;
   notifying a manageable component factory by an application module of a need to load class information regarding a class of object running externally to said application server virtual machine;
   using a descriptor of said external object class to register class information to a manageable component server, said manageable component server also running within said application server virtual machine; and
   loading said class information by said application module from said manageable component server.

2. The process as set forth in claim 1 wherein said step of providing one or more application module components comprises providing one or more Java Management Extension MBean components.

3. The process as set forth in claim 1 wherein said step of executing said application module(s) within an application server virtual machine comprises executing one or more Java modules in a Java Virtual Machine (JVM).

4. The process as set forth in claim 3 wherein said Java Virtual Machine is a Java 2 Platform Enterprise Edition JVM.

5. The process as set forth in claim 1 wherein said step of using a descriptor of said external object class to register class information to a manageable component server comprises using an Extensible Markup Language descriptor.

6. The process as set forth in claim 1 wherein said step of using a descriptor of said external object class to register class information to a manageable component server comprises registering class information with a Java Management Extension MBean Server.

7. The process as set forth in claim 1 further comprising the step of providing an IBM WebSphere application server.

8. A computer readable medium encoded with software for externalizing classloader information for object-oriented application programs through an interface at runtime, the software performing the steps of:
   providing one or more application module manageable components within an application server virtual machine associated with one or more application modules;
   executing said application module(s) within an application server virtual machine;
   notifying a manageable component factory by an application module of a need to load class information regarding a class of object running externally to said application server virtual machine;
   using a descriptor of said external object class to register class information to a manageable component server, said manageable component server also running within said application server virtual machine; and
   loading said class information by said application module from said manageable component server.

9. The computer readable medium as set forth in claim 8 wherein said software for providing one or more application module components comprises one or more Java Management Extension MBean components.

10. The computer readable medium as set forth in claim 8 wherein said software for executing said application module(s) within an application server virtual machine comprises software for executing one or more Java modules in a Java Virtual Machine (JVM).

11. The computer readable medium as set forth in claim 10 wherein said Java Virtual Machine software is Java 2 Platform Enterprise Edition JVM software.

12. The computer readable medium as set forth in claim 8 wherein said software for using a descriptor of said external object class to register class information to a manageable component server comprises software for using an Extensible Markup Language descriptor.

13. The computer readable medium as set forth in claim 8 wherein said software for using a descriptor of said external object class to register class information to a manageable component server comprises software for registering class information with a Java Management Extension MBean Server.

14. The computer readable medium as set forth in claim 8 further comprising software for providing an IBM WebSphere application server.

15. An object-oriented system for loading external class information into an Application Server virtual machine, said Application Server virtual machine running one or more application module manageable components, said system comprising:
   a notification to a manageable component factory by an application module under execution by said virtual machine of a need to load class information regarding a class of object running externally to said application server virtual machine;
   a descriptor of said external object class to register class information accessible to said manageable component factory, said factory providing a registration of a manageable component associated with said externally running object class; and
   a manageable component server adapted to receive said registration, and adapted to loading said class information for said requesting application module.

16. The system as set forth in claim 15 wherein said application module components comprise providing one or more Java Management Extension MBean components.

17. The system as set forth in claim 15 wherein said application server virtual machine comprises a Java Virtual Machine (JVM).

18. The system as set forth in claim 17 wherein said Java Virtual Machine is a Java 2 Platform Enterprise Edition JVM.

19. The system as set forth in claim 15 wherein said descriptor comprises an Extensible Markup Language descriptor.

20. The system as set forth in claim 15 wherein said manageable component server comprises a Java Management Extension MBean Server.

21. The system as set forth in claim 15 further comprising an IBM WebSphere application server.

* * * * *